UNITED STATES PATENT OFFICE.

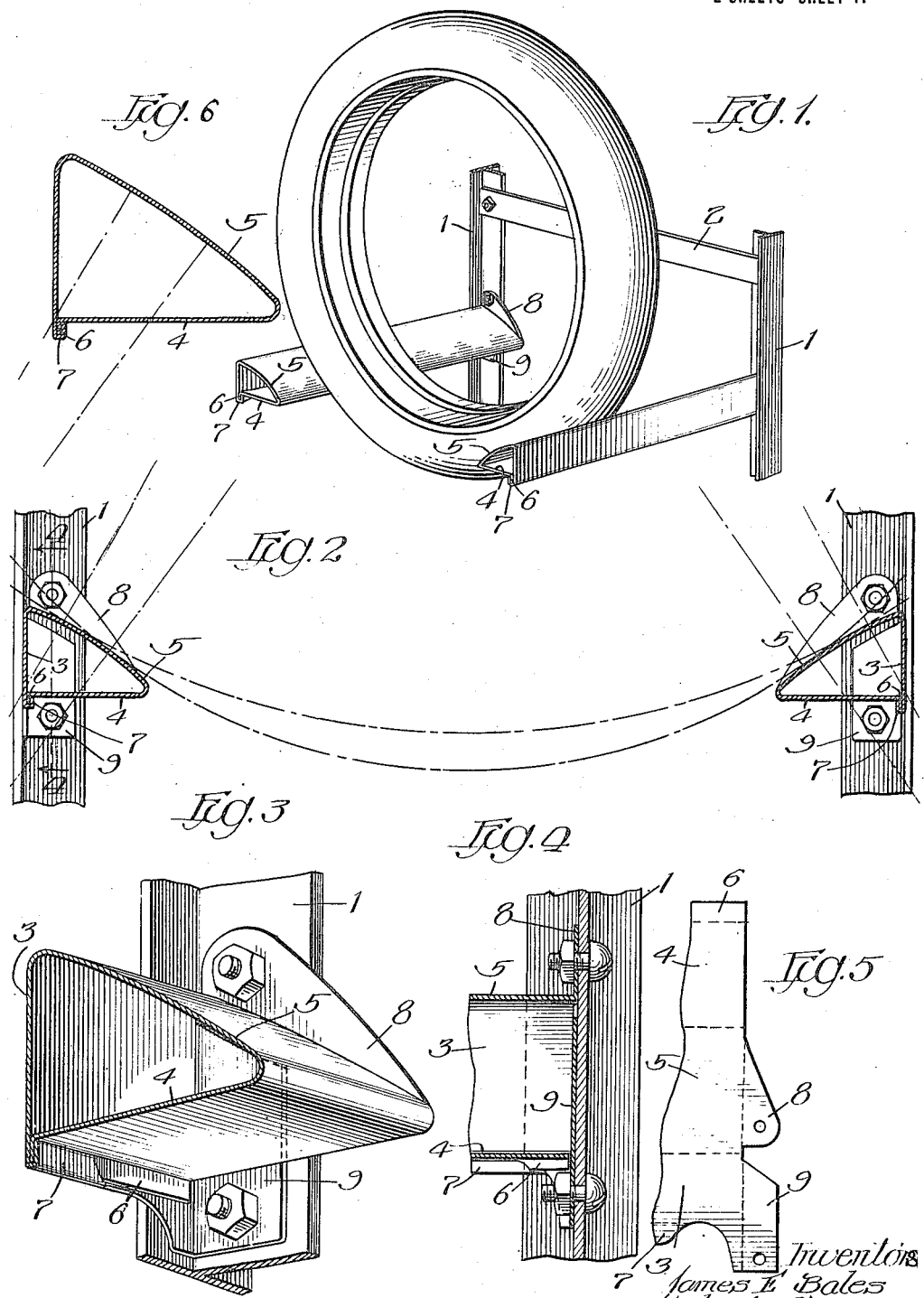

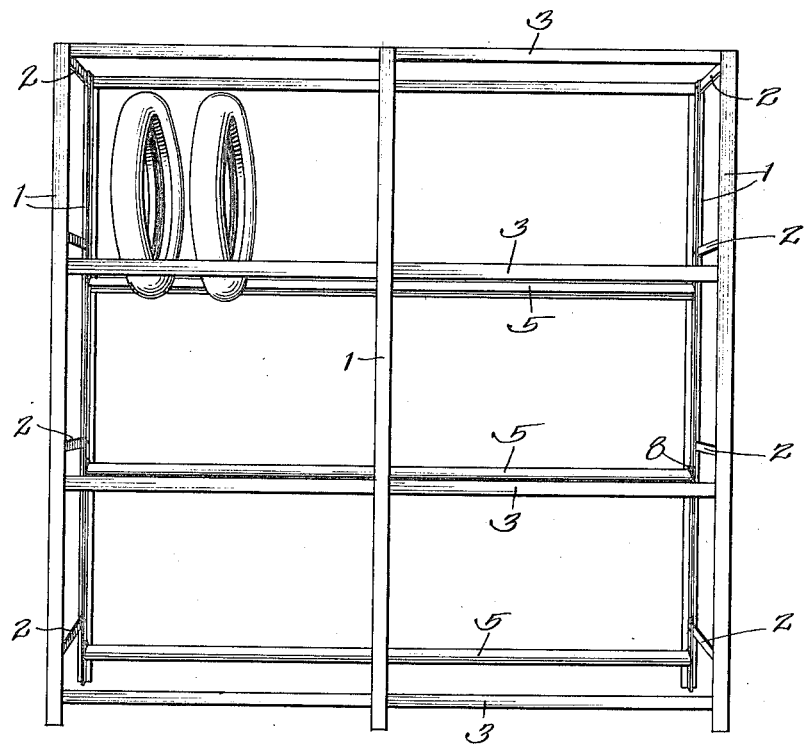

JAMES E. BALES AND JOHN B. O'CONNOR, OF AURORA, ILLINOIS, ASSIGNORS TO LYON METALLIC MANUFACTURING COMPANY, OF AURORA, ILLINOIS, A CORPORATION OF ILLINOIS.

TIRE-RACK.

1,193,498.　　　　Specification of Letters Patent.　　Patented Aug. 8, 1916.

Application filed December 6, 1915. Serial No. 65,197.

*To all whom it may concern:*

Be it known that we, JAMES E. BALES and JOHN B. O'CONNOR, citizens of the United States, residing at Aurora, in the county of Kane and State of Illinois, have invented a certain new and useful Improvement in Tire-Racks, of which the following is a specification.

Our invention relates to tire racks for the storage of tires for motor vehicles.

It will be understood that tire manufacturers and the larger distributers frequently store tire casings in very large quantities. These casings are heavy and vary considerably in diameter; for example, the diameters commonly marketed to-day vary from 28 to 37 inches. Present day requirements demand not only that the racks shall accommodate all sizes of tires and present a flat surface for them to rest upon, but also demand that the racks themselves shall be of minimum weight and bulk, consume a minimum amount of material and at the same time possess great rigidity on account of the heavy load that must be carried. Attempts have been made to meet these requirements, (see Waters's Patent No. 1,075,801) but these previous constructions have left something to be desired.

The object of our invention is to produce the rack in skeleton form which will accommodate itself to different sized tires without cutting, indenting, or, otherwise injuring the same and which at the same time will combine lightness with rigidity.

We accomplish our object by the construction illustrated in the accompanying drawings, in which—

Figure 1 is a perspective view of a portion of our rack showing a tire casing in position. Fig. 2 is a sectional view taken transversely to the rack and illustrating the manner in which tire bars are formed to prevent indenting any ordinary sized tire. Fig. 3 is a sectional perspective view showing in detail the relationship of the tire bar to the upright and the shape of the lugs by which the bar is fastened to the upright. Fig. 4 is a vertical sectional view taken longitudinally through the tire bar and showing the relative positions of the bar and the supporting upright. Fig. 5 is a view showing the end of the blank from which the tire bar in its preferred form is made. Fig. 6 is a view showing a cross section of the tire bar and illustrating the different radii employed in forming the tire-supporting surface. Fig. 7 is a general perspective view of the rack.

Similar numerals refer to similar parts throughout the several views.

Generally speaking, the rack consists of uprights tied together at suitable intervals and supporting the tire bars between them. In the design selected to illustrate the invention, the uprights 1 consist of T bars with their sectional flanges facing toward each other. The cross section of the upright is, however, non-essential and may be varied without departing from the spirit of the invention. The uprights are tied together by tie bars 2. The tire bars, which extend longitudinally across the front and back of the rack, are of sheet metal and are of special configuration. They have three principal faces, to-wit: the back wall 3, which is approximately vertical, the bottom wall 4, which is approximately horizontal and the top 5 which unites the two and presents a convex outer surface which extends from the top of the back wall to the inner edge of the bottom wall. This tire bar has a closed cross section, the top being joined to the back wall and the bottom wall, and the back wall and bottom wall being joined together at the outer lower edge. In the preferred construction shown, the tire bar is formed of a single piece and the top is integral with the back wall and with the bottom wall. The back wall and bottom wall are joined together at the foot of the back wall by forming a depending flange 6 at the back of the bottom wall and forming a flange 7 at the bottom of the back wall which bends around under the bottom of the flange 6 and engages it on the inner side, as best shown in Fig. 3. The flanges may be spot welded, riveted or otherwise fastened together if desired, but we have found after subjecting the rack to severe tests that the configuration is such that no fastening expedients are necessary in addition to the interfitting of the flanges 6 and 7. In other words, in our construction the parts are interlocked at the back in such a manner that no further provision need be made for holding these parts together.

The top 5 is not flat as in the Waters patent mentioned but is rounded or convexed upward and this surface has a varying curvature, the inner portion conforming to a curve having a radius of approximately 8½ inches and the outer portion conforming to a curve having a radius of 14 inches, as suggested in Fig. 6 of the drawing. Consequently, the curve is flatter near the top and steeper near the bottom, the result being that although the bar is comparatively narrow crosswise of the rack, it will present a substantially tangential surface to tires of all the usual sizes. The theory is suggested by broken lines in Fig. 2. In the preferred form, not only are the parts 3, 4 and 5 integral with each other, but they are provided at the ends with integral lugs by which the bars are fastened to the uprights. The end portion of the blanks, illustrating the form of the lugs is shown in Fig. 5. The central top portion 5 has an extension 8 at the end, which when turned up forms a lug by which it may be bolted to the transverse or inwardly extending portion of the upright. The back wall portion 3 has an extension 9 at the end, which when folded up forms another lug which also contacts the inwardly extending surface of the upright.

As a result of our invention we are able to greatly reduce both the gage of sheet metal employed and reduce the transverse dimensions of the tire bar and at the same time greatly increase the rigidity of the tire bar over bars as previously constructed. The closed box-like section of the bar with its marginal edges interfitting with each other produces a stiffness which is remarkable, the bars being able to withstand great loads without appreciable flexure even when the bars are of great length between uprights. Furthermore, this construction obtains high resistance as against a torsional or twisting movement of the bar. This also adds to its inflexibility. This rigidity is obtained with thinner material than it has heretofore been possible to use, and furthermore the width of the bar from front to back is much shortened; for example, it is possible to employ a rack but 3 inches from front to back as against 5½ or 6 inches in a rack of the type shown in the said Waters patent. The varying radius of curvature of the top 5 makes it possible to thus decrease the width of the bar without reducing the range of diameters of the tires which the rack may accommodate. When in use the top 5 will present a tangential surface to tires running all the way from 28 to 37 inches in diameter.

Having thus described our invention what we claim as new and desire to secure by Letters Patent, is:—

1. A tire rack having uprights and tire bars extending horizontally from one upright to another, said tire bars being of sheet metal and having a top curving downwardly and inwardly, said top having varying radii of curvature, the longer radius being employed for the portion nearer the back wall, and the shorter radius for the portion nearer the inner edge.

2. In a tire rack, the combination of uprights and tire bars extending horizontally from one to the other, said tire bars having three principal portions, forming a back wall, bottom wall, and tire supporting surface, the latter pitching downwardly and inwardly, the bottom wall having a depending marginal flange at the back and the back wall having a marginal flange at the lower edge folding up and around the flange on the bottom wall.

In witness whereof we have hereunto subscribed our names.

JAMES E. BALES.
JOHN B. O'CONNOR.